(12) United States Patent  (10) Patent No.: US 8,824,261 B1
Miller et al.  (45) Date of Patent: Sep. 2, 2014

(54) PEER TO PEER VIBRATION MITIGATION

(71) Applicant: Seagate Technology LLC, Cupertino, CA (US)

(72) Inventors: Michael Howard Miller, Eden Praire, MN (US); Richard Esten Bohn, Shakopee, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/788,548

(22) Filed: Mar. 7, 2013

(51) Int. Cl.
*G11B 5/58* (2006.01)
*G11B 27/36* (2006.01)

(52) U.S. Cl.
CPC ........................... *G11B 27/36* (2013.01)
USPC .............. 369/53.42; 360/97.19; 700/280

(58) Field of Classification Search
None
See application file for complete search history.

(56) References Cited

U.S. PATENT DOCUMENTS

| | | | |
|---|---|---|---|
| 7,434,097 B2 * | 10/2008 | Guha et al. | 714/6.32 |
| 7,694,188 B2 | 4/2010 | Raghraman et al. | |
| 7,761,244 B2 * | 7/2010 | Gross et al. | 702/34 |
| 7,802,019 B2 * | 9/2010 | Shu et al. | 710/8 |
| 8,204,716 B2 * | 6/2012 | Gross et al. | 702/183 |
| 8,271,140 B2 | 9/2012 | Cagno et al. | |
| 8,549,219 B1 * | 10/2013 | Murakami | 711/112 |
| 2012/0182641 A1 * | 7/2012 | Gamble et al. | 360/75 |
| 2013/0058034 A1 * | 3/2013 | Wada et al. | 361/679.34 |
| 2013/0258521 A1 * | 10/2013 | Yang et al. | 360/97.13 |

* cited by examiner

*Primary Examiner* — Brenda Bernardi
(74) *Attorney, Agent, or Firm* — HolzerIPLaw, PC (57) ABSTRACT

A system for peer-to-peer vibration mitigation in a distributing computing system includes a secondary communication interface over which chassis management electronics (e.g., a chassis-level controller) and/or system storage nodes may initiate communications to in order to affect system changes that may decrease vibration-related performance degradation in the system.

19 Claims, 4 Drawing Sheets

PEER TO PEER VIBRATION MITIGATION

CROSS REFERENCE TO RELATED APPLICATIONS

The present application is related to U.S. patent application Ser. No. 13/788,425, entitled "Adaptive Vibration Mitigation" and filed concurrently herewith, which is specifically incorporated by reference herein for all that it discloses and teaches.

SUMMARY

Implementations described and claimed herein provide for a physical or logical drive operation interface in a distributed computing and storage environment over which communications may be initiated by storage nodes and/or system-level controllers to effectuate real-time corrections actions that mitigate system vibrations.

This Summary is provided to introduce an election of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various implementations and implementations as further illustrated in the accompanying drawings and defined in the appended claims.

DETAILED DESCRIPTIONS

Vibration can be a cause of hard disc drive performance problems, particularly in systems containing multiple disc drives in the same enclosure. Vibrations can be caused by forces including without limitation a drive's own actuator moment, the activity of other drives in a system enclosure, other sources of vibration such as cooling fans, etc.

In a distributed computing system, a central host server may query or monitor one or more storage node logs to discover information relating to the amount of vibration experienced at each of the storage nodes. However, vibrational problems may be discovered after the fact or go unnoticed entirely if the central host server does not aggressively monitor or query the storage nodes over the primary data interface. Because primary data interfaces are typically very busy, aggressive monitoring of the storage nodes is not always feasible.

Another problem with existing distributed and computing systems is that primary data interfaces are sometimes inaccessible to certain parts of the system that are able to manage generators of mechanical energy that create system vibrations. For example, storage nodes may be located in a chassis having chassis management electronics. Unlike a remote system host, the chassis management electronics typically have knowledge of the physical locations of the individual storage nodes. However, the chassis management electronics typically lack the ability to communicate with the storage nodes over the primary data interface.

To address these and potentially other problems, implementations of the systems described herein provide for a secondary communication interface over which the chassis management electronics and/or system storage nodes can initiate communications to effectuate performance-increasing system changes.

Figure 1:
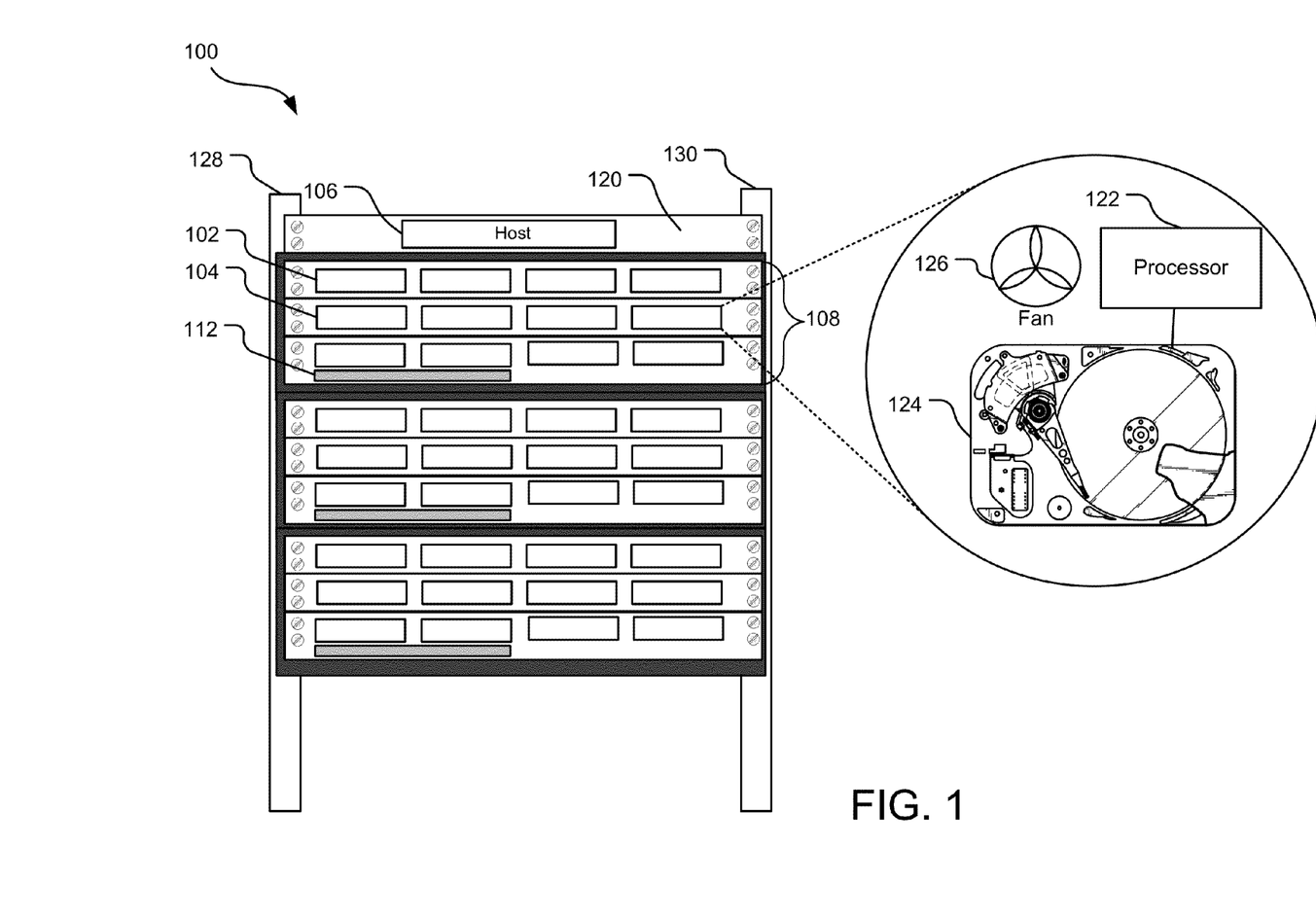
FIG. 1 illustrates one implementation of a distributed computing system with peer-to-peer vibration mitigation capability.

FIG. 1 illustrates one implementation of a distributed computing system 100 with peer-to-peer vibration mitigation capability. The distributed computing system 100 has a central host server 106 that is communicatively coupled to a plurality of storage nodes (e.g., storage nodes 102, 104) in the distributed computing system 100. Each computing node includes one or more processing units (e.g., a processor 122) attached to one or more hard drive assemblies (e.g., an HDA 124). Typically, a cooling fan 126 cools one or more storage nodes in the distributed computing system 100. The HDA 124 of each storage node performs storage-related tasks such as read and write operations, and the processor 122 of each storage node is configured to perform storage and/or computing tasks for the distributed computing system 100.

The HDA 124 typically includes an actuator arm that pivots about an axis of rotation to position a transducer head, located on the distal end of the arm, over a data track on a media disc. The movement of the actuator arm may be controlled by a voice coil motor, and a spindle motor may be used to rotate the media disc below the actuator arm. In operation, rotational vibrations experienced by the HDA 124 can result in unwanted rotation of the actuator arm about the arm's axis of rotation (e.g., in the cross-track direction). When severe enough, this unwanted rotation can knock the transducer head far enough off of a desired data track that a positional correction is required. Such events can contribute to diminished read and/or write performance in the HDA 124 and the distributed computing system 100.

Each HDA 124 in the distributed computing system 100 communicates with at least one processor 122. The processor 122 is able to detect a position of the transducer head of the HDA 124 at any given time based on read sensor signals sent from the transducer head or servo pattern information that is detected by the transducer head and passed to the processor 122. Thus, during a reading or writing operation, the processor 122 may detect that the drive is not tracking properly and take steps to correct the tracking. For example, the processor 122 may determine that the transducer head has hit an off-track limit when vibrations cause the transducer head to stray off of a desired data track. In such cases, the processor 122 may instruct the drive to halt the current reading or writing operation for one or more rotations of the disc so that the transducer head can be repositioned.

The processor 122 of each of the storage nodes collects information from the HDAs 124 of each storage node regarding the degree to which the HDAs 124 are impacted by vibration. In one implementation, the processor 122 of each storage node measures I/O degradation attributable to vibration occurring at the storage node. In the same or an alternate implementation, the processor 122 may record I/O degradation information in one or more log files. For example, the processor 122 of a storage node may record computation times related to each task or measurements of one or more vibration sensors in the log file.

The processor 122 of each of the storage nodes is further configured to communicate performance degradation information to the host server 106, other storage nodes in the system, and/or other system processing entities such as a chassis-level controller (e.g., the chassis-level controller 112 in chassis 108). As used herein, the term "performance degradation" refers to I/O degradation attributable to system vibrations. Certain factors such as temperature, humidity, and altitude may make a storage node more susceptible to performance degradation.

The storage nodes (e.g., storage nodes 102, 104) illustrated in FIG. 1 are distributed across multiple chassis (e.g., a chassis 108) mounted on racks 128, 130. In some cases, one or more rack-mounted chassis racks may be kept in a cabinet. Each chassis 108 includes multiple storage nodes and a plurality of cooling fans (e.g., fan 126). In one implementation, the cooling fan 126 is positioned immediately behind a vertical stack of three storage nodes. In another implementation, one or more of the processors 122 of storage nodes in close physical proximity to the cooling fan 126 controls the cooling fan 126. In yet another implementation, a processor 122 of the chassis-level controller 112 controls the cooling fan 126.

In various implementations, the storage nodes may be distributed in a variety of configurations employing any number of racks, chassis, or fans. In at least one implementation, the distributed computing system 100 includes storage nodes at two separate physical locations (for example, in different facilities). In another implementation, each chassis (e.g., the chassis 108) includes one or more temperature, humidity, or GPS sensors.

In the example illustrated by FIG. 1, the host server 106 resides on a single, rack-mounted computer server 120. However, in other implementations, the host server 106 may be distributed across one or more of the processors 122 of the storage nodes or across other processors or other systems of processors. The host server 106 may be communicatively coupled to the processors of the storage nodes and/or processors of one more of the chassis-level controllers.

In one implementation, the host server 106 has the ability to initiate, receive, and/or respond to communications with one or more storage nodes or chassis-level controllers (e.g., the chassis-level controller 112) in the distributing computing system 100. For example, the host server 106 may distribute a computing workload among the storage nodes or query the processors of the storage nodes over a data interface to obtain storage node performance degradation information.

In another implementation, the storage nodes and/or chassis-level controllers can initiate communications with the host server 106. For example, one or more storage nodes and/or chassis-level controllers may inform the host server 106 of a degraded system component in a storage node. Here, the host server 106 may take a corrective action, such as refraining from assigning storage tasks to the storage node with the degraded component in the future.

In another implementation, host server 106 communicates with the storage nodes in a chassis through the chassis-level controller of that chassis. For example, the host server 106 may query the chassis-level controller 112, rather than the individual storage nodes, to request storage node performance degradation information. In another implementation, the host server 106 queries the chassis-level controller 112 to gain knowledge of actions taken by the chassis-level controller and/or the storage nodes. For example, the host server 106 may query the chassis-level controller 112 and learn that the chassis-level controller 112 has recently altered the speed of a cooling fan to try to reduce the performance degradation observed in the storage node 102.

Each processor 122 of each of the storage nodes in the distributed computing system 100 may be communicatively coupled to a chassis-level controller (e.g., the chassis-level controller 112), the host server 106, and/or the processors of some or all of the other storage nodes in the system 100. Thus, the storage nodes in a chassis may actively communicate with the chassis-level controller 112, the host server 106, and/or other storage nodes in the system to effectuate changes to the system that improve system performance.

In one example implementation, the processor 122 of the storage node 102 is communicatively coupled to the processors of each of the storage nodes located in same chassis (i.e., the top-level chassis 108 on the racks 128, 130). Here, the storage node 102 can initiate communications with any number of the other storage nodes located in the same top-level chassis 108. In yet another implementation, the processor 122 of the storage node 102 is communicatively coupled to the processors of each of the storage nodes in the entire distributed computing system 100.

The chassis-level controller of each chassis manages the electronics in the chassis (such as the one or more cooling fans 126) and has knowledge of the physical location of each of the storage nodes in the chassis. In at least one implementation, the host server 106 lacks such an understanding of the physical location of each of the storage nodes in the chassis 108. Thus, a chassis-level controller may be uniquely suited to troubleshoot and diagnose sources of vibration within a chassis.

In one implementation, a storage node 102 has an internal accelerometer that may determine directional aspects of vibrations detected in the storage node. Here, the processor 122 of the storage node 102 may communicate such information (i.e., information related to the dimensional influence of vibrations) to request that another system component perform a corrective action for decreasing vibration-related performance degradation in the storage node 102.

In one implementation, the chassis-level controller of each chassis monitors performance degradation experienced at each of the storage nodes of the chassis, as well as other storage node conditions such as temperature, power supply, voltage, humidity, barometric pressure, etc. The chassis-level controller may utilize such information to determine one or more sources of performance degradation for the storage nodes.

In one implementation, the chassis-level controller is communicatively coupled to the processor in each of the storage nodes in the chassis and also to the host server 106. Thus, the chassis-level controller may serve as an intermediary for information transmitted between the host server 106 and the storage nodes. For example, the host server 106 may request performance degradation information from the chassis-level controller 112 and the chassis-level controller 112 may then query each of the processors 122 of the storage nodes to obtain such information and relay it back to the host server 106.

In yet another implementation, the chassis-level controller 112 monitors the nodes and periodically reports performance degradation information back to the host server 106 without receiving a query for such information from the host server 106. For example, the chassis-level controller 112 may notify the host server 106 when a storage node is experiencing a high level of performance degradation. The host server 106 may react by taking an action to improve system performance, such as by redistributing certain computing tasks or by alerting a system administrator of a persistent problem.

In the same or an alternate implementation, the chassis-level controller 112 is operable to may receive, react, and/or reply to communications initiated by a processor 122 in one of the storage nodes. For example, the processor 122 in the storage node 102 may alert the chassis-level controller 112 of a high level of performance degradation observed in the storage node 102 so that the chassis-level controller 112 can take action to try to reduce the performance degradation (e.g., such as by altering a fan speed in the chassis). Alternatively, the chassis-level control 112 may convey an alert message to the host server 106 so that the host server 106 can take some action to try to mitigate the performance degradation. In another implementation, the storage nodes communicate directly with the host server 106 without involving the chassis-level controller 112.

Figure 2:
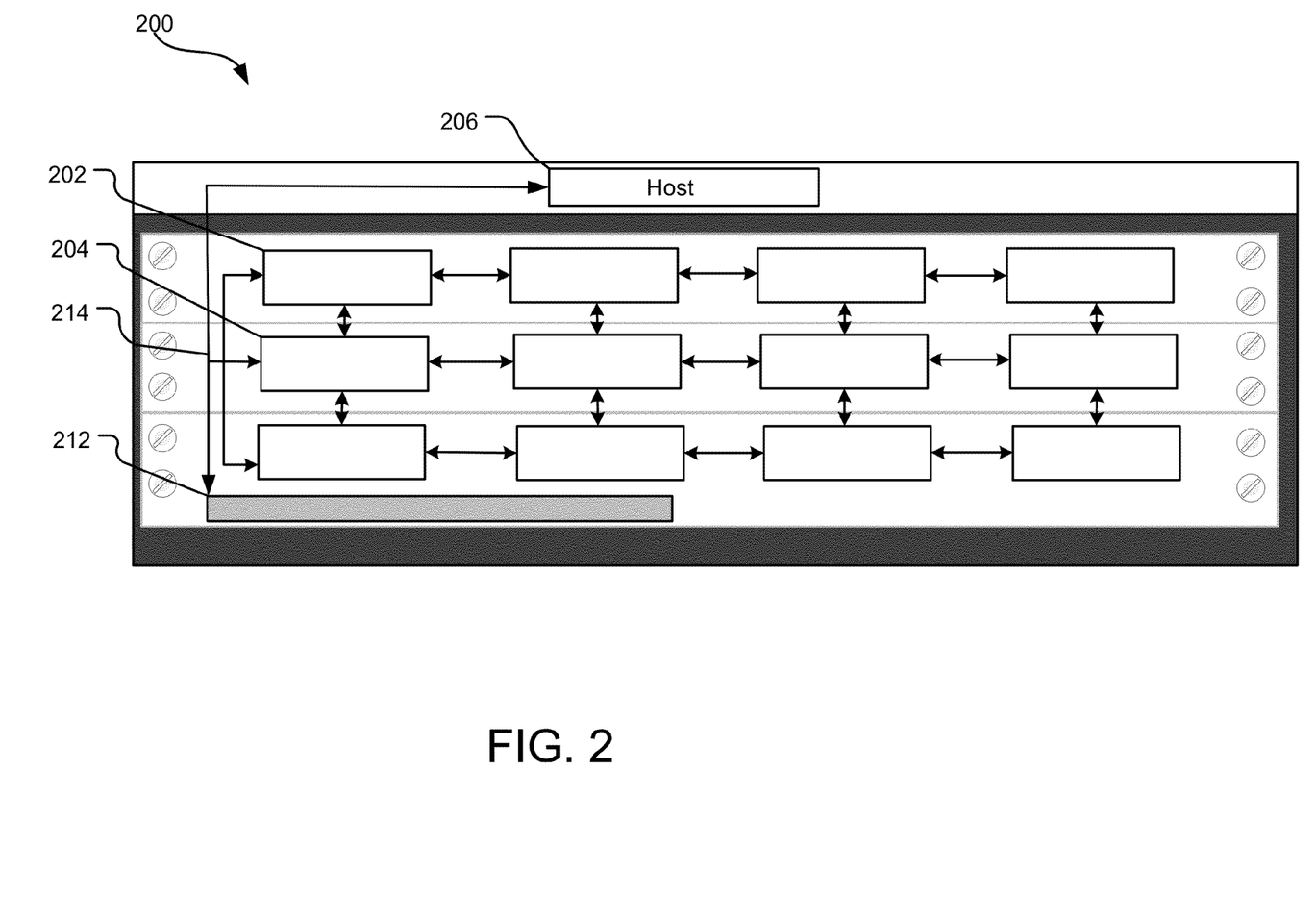
FIG. 2 illustrates another implementation of a distributed computing system with peer-to-peer vibration mitigation capability.

FIG. 2 illustrates another implementation of a distributed computing system 200 with peer-to-peer vibration mitigation capability. The distributed computing system 200 has a central host server 206 that is communicatively coupled by way of a drive operation interface 214 to a plurality of storage nodes (e.g., storage nodes 202 and 204) in the distributed computing system 200. Each storage node includes one or more processing units (not shown) communicatively coupled to one or more hard drive assemblies (not shown). A chassis-level controller 212 is also communicatively coupled to each of the storage nodes and to the host server 206 by way of the drive operation interface 214.

The drive operation interface 214 allows the storage nodes (e.g., the storage nodes 202, 204), the chassis-level controller 212, and/or the central host server 206 to initiate communications with one or more external components in the distributed computing system 200. For example, the driver operation interface 214 allows a storage node to initiate communications with another storage node, with the chassis-level controller 212, and/or with the host server 206. In contrast with traditional distributed computing systems where the host server 206 monitors system performance by periodically making queries to the processors of the storage nodes, the drive operation interface 214 permits the storage nodes to initiate communications with other processing entities in the distributed computing system to communicate real-time performance problems.

In one implementation, the drive operation interface 214 operates through the same physical connections that are used for a primary data interface of the distributed computing system 200. That is, the electrical connections through which data is read from and written to the storage nodes may also serve as the conduit for communication from one storage node to another storage node, from one storage node to the host server 206, from one storage node to the chassis-level controller 212, etc. In such an implementation, the drive operation interface 214 is thus a separate logical interface that utilizes the same physical interface as the primary data interface. Here, any corrective actions taken by system processing entities (such as the storage node processors or the system level chassis 212) may be communicated back up to the host server 206 so that the host is aware of changes in the distributed computing system 200.

In another implementation, the drive operation interface 214 operates through a secondary physical interface that is separate from and in addition to the primary data interface of the distributed computing system 200. Here, data is read from and written to the storage nodes over a different physical interface than the drive operation interface 214. For example, the processors in the storage nodes may communicate with one another, with the host server 206, and/or with the chassis-level controller 212 over a separate physical connection such as an I2C, SAS, SATA, USB, PCIe or Ethernet connection.

The drive operation interface 214 may facilitate communications between storage nodes, between storage nodes and chassis-level controllers, between storage nodes and the host server 206, between chassis-level controllers and the host server 206.

Information communicated over the drive operation interface 214 may include performance-related data for each of the storage nodes in the distributed computing system 200. For example, the storage node 202 may transmit, over the drive operation interface 214, a message that it is taking longer than expected to complete a storage or computing task. Alternatively, the storage node 202 may utilize the drive operation interface 214 to transmit a measurement observed by one or more vibration sensors in storage node 202. The storage node 202 may communicate such information as it relates to observations over the past few days, weeks, months, etc.

In addition to communicating the amount of vibration and/or performance degradation experienced at a storage node, the storage nodes may evaluate and communicate likely reasons for observed vibration and/or performance degradation problems. In one example implementation, the processor in the storage node 202 determines that it has seen higher than average performance degradation over the past several weeks and reports to the host 206, over the drive operation interface 214, that a degraded hard drive disk or other system component is likely the problem.

In another implementation, a storage node trouble-shoots performance-related problems by seeking out information regarding possible sources of vibration in the storage node's localized environment. For example, the processor of the storage node 202 may communicate with the processors of physically adjacent storage nodes to find out what type of tasks are currently being performed on the physically adjacent storage nodes. If it can be determined that one of the physically adjacent nodes is performing a high I/O task, the storage node 202 may determine that its own performance-related problems are attributable to incident vibrations caused by the task in the physically adjacent node.

In at least one implementation, the storage nodes can independently take real-time corrective actions to respond to information received over the drive information interface 214. For example, the storage node 202 might detect that it is experiencing a high degree of performance degradation and send out a "distress" cry to other storage nodes in close physical proximity. One or more storage nodes that receive the distress cry may respond by adjusting their own behavior in order to decrease vibrations affecting the storage node 202. Specifically, the storage nodes that receive the distress cry may postpone one or more of their own storage or computing tasks to reduce vibrations incident on the storage node 202 long enough for the storage node 202 to complete a current task.

In yet another implementation, the storage nodes are able to redistribute storage and/or computing tasks among themselves over the drive operation interface 214. For example, the storage node 202 may detect that it is having difficulty completing a write operation task and determine that the difficulty is most likely due to a hard drive disk component in need of repair. Here, the storage node 202 may utilize the drive operation interface 214 to seek out a storage node to accept transfer of the write operation task. That is, the storage node 202 may utilize the drive operation interface 214 to identify a "free" storage node that is unoccupied or currently performing a low-priority task that can be postponed. Once a free storage node is identified, the storage node 202 can transfer the write operation task to the free storage node. The free storage node can then complete the write operation task while temporarily postponing any of its own low-priority tasks. In such cases where a task is transferred from one storage node to another, the host server 206 may be notified of the transfer to ensure that the host server 206 maintains knowledge of where all data is located in the distributed computing system 200.

In some implementations, the chassis-level controller 212 uses information received over the drive operation interface 214 to diagnose and respond to one or more sources of vibration. For example, the storage node 202 may send performance degradation information along with operational information, such as voltage or internal storage node temperatures to the chassis-level controller 212. Here, the chassis-level controller 212 can analyze such information to determine which corrective actions are likely to improve performance in the storage node 202. For instance, the chassis-level controller 212 may detect that the storage node 202 is warmer than average because of a low voltage causing increased current. In response, the chassis-level controller 212 may increase the speed of a nearby cooling fan. Alternatively, the chassis-level controller 212 may ask the host server 206 to avoid scheduling all jobs or certain types of jobs in the storage node 202 in the future.

In another implementation, the chassis-level controller 212 is able to initiate communications with the storage nodes and/or respond to inquiries from the storage nodes over the drive operation interface 214 in order to facilitate adaptive vibration mitigation. For example, the storage node 202 may inform the chassis-level controller 212 of the most likely sources of observed vibrations in the storage node 202 and the chassis-level controller 212 may troubleshoot by making changes to electronic generators of mechanical vibration to try to improve performance in the storage node 202.

Figure 3:
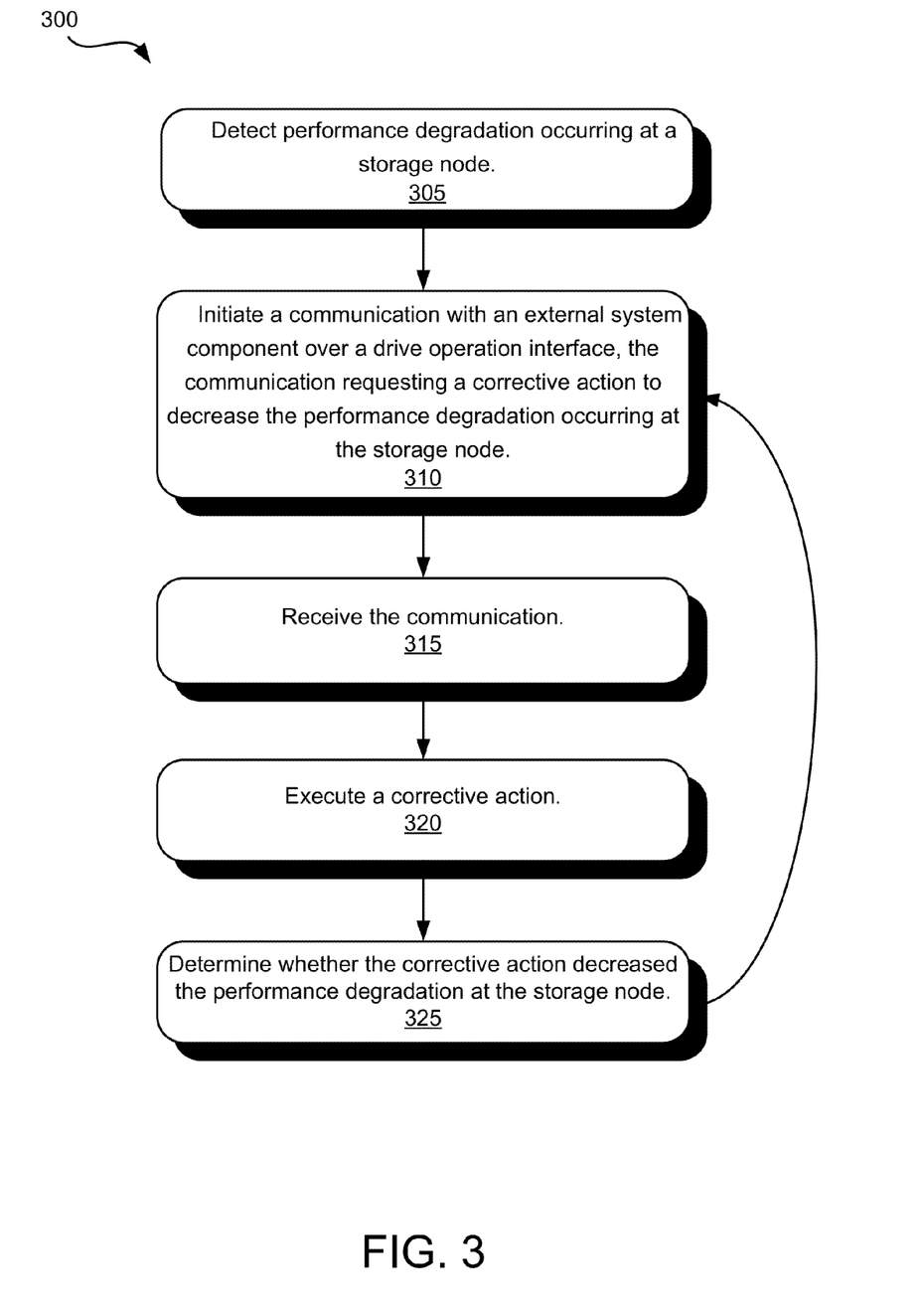
FIG. 3 illustrates example operations for peer-to-peer vibration mitigation according to one implementation.

FIG. 3 illustrates example operations of peer-to-peer vibration mitigation in a distributing computing system according to one implementation. A detection operation 305 detects performance degradation occurring in a "distressed" storage node. For example, a processor of the distressed storage node may detect that a hard drive assembly in the node is taking longer than expected to perform a task or that one or more vibration sensors located in the distressed storage node have recently measured a high degree of vibration. Alternatively, a chassis-level controller communicatively coupled to the storage nodes in the distributed computing system might "check" on the distressed node and discover the high degree of performance degradation occurring in the distressed node.

After the detection operation 305, a communication initiation operation 310 initiates a communication with an external system component over a drive operation interface, the communication requesting a corrective action likely to decrease the performance degradation observed at the distressed node. In one implementation, the processor of the distressed storage node initiates the communication operation 310 by sending out a distress cry over the drive operation interface to alert other storage nodes, a system host, and/or the chassis-level controller of the performance degradation. In another implementation, the processor of the distressed storage node communicates to a chassis-level controller a degree of vibration detected in the storage node, and the chassis-level controller uses its knowledge of the location of other storage nodes within the distributed computing system 300 to identify sources of vibration. Here, the chassis-level controller may communicate a corrective instruction to one or more system components for decreasing the vibration-related performance degradation in the storage node.

In another implementation, the communication initiation operation 310 is performed by a processor of the chassis-level controller and is a request for additional system information that may assist in diagnosing the sources of the performance degradation in the distressed node. For example, the chassis-level controller may communicate with the processors of storage nodes physically adjacent to the distressed storage node and request specifics of the types of tasks currently being performed on those storage nodes.

A receiving operation 315 receives and processes the initial communication sent by the communication initiation operation 310. Optionally, the processor performing the receiving operation 315 (such as a processor of a storage node, the chassis-level control, or of a central host server) may respond to the communication. For example, a storage node physically adjacent to the distressed node may receive a distress cry from the distressed storage node and respond by providing details of the task currently being performed on the physically adjacent storage node. In yet another implementation, the chassis-level controller initially performs the receiving operation 315 and relays the distress cry of the distressed storage node up to a host server. In another implementation, the chassis-level controller performs the receiving operation 315 and responds by altering a state of one or more components in the chassis in order to improve performance of the distributed computing system.

After the initial communication is received, one or more processing entities in the distributing computing system may execute, via an execution operation 320, a corrective action in response to the communication to decrease the performance degradation occurring at the distressed node. For example, a storage node physically adjacent to the distressed node may receive a distress cry from the distressed node and respond by temporarily halting a high I/O task to decrease vibrations incident on the distressed node.

In another implementation, the chassis-level controller receives a distress cry from the distressed storage node and responds by affecting a system component, such as by altering the speed of a fan to reduce vibrations in the distressed storage node. In yet another implementation, the chassis-level controller utilizes knowledge of the physical location of each of the drives in a chassis to identify likely sources of vibration in the distressed node and to determine what corrective action is necessary. In one implementation, the chassis-level controller relays such a determination to the host server so the host server can take an appropriate corrective action via the execution operation 320.

After a corrective action has been executed, a determination operation 325 determines whether or not the corrective action decreased the performance degradation observed at the distressed node. For example, the processor of the distressed node may detect whether vibrations in the storage node have decreased. If the performance degradation has not decreased, additional communications may be initiated and operations 310-325 may be repeated. Thus, additional corrective actions may be executed in attempt to decrease the performance degradation in the distressed storage node.

Figure 4:
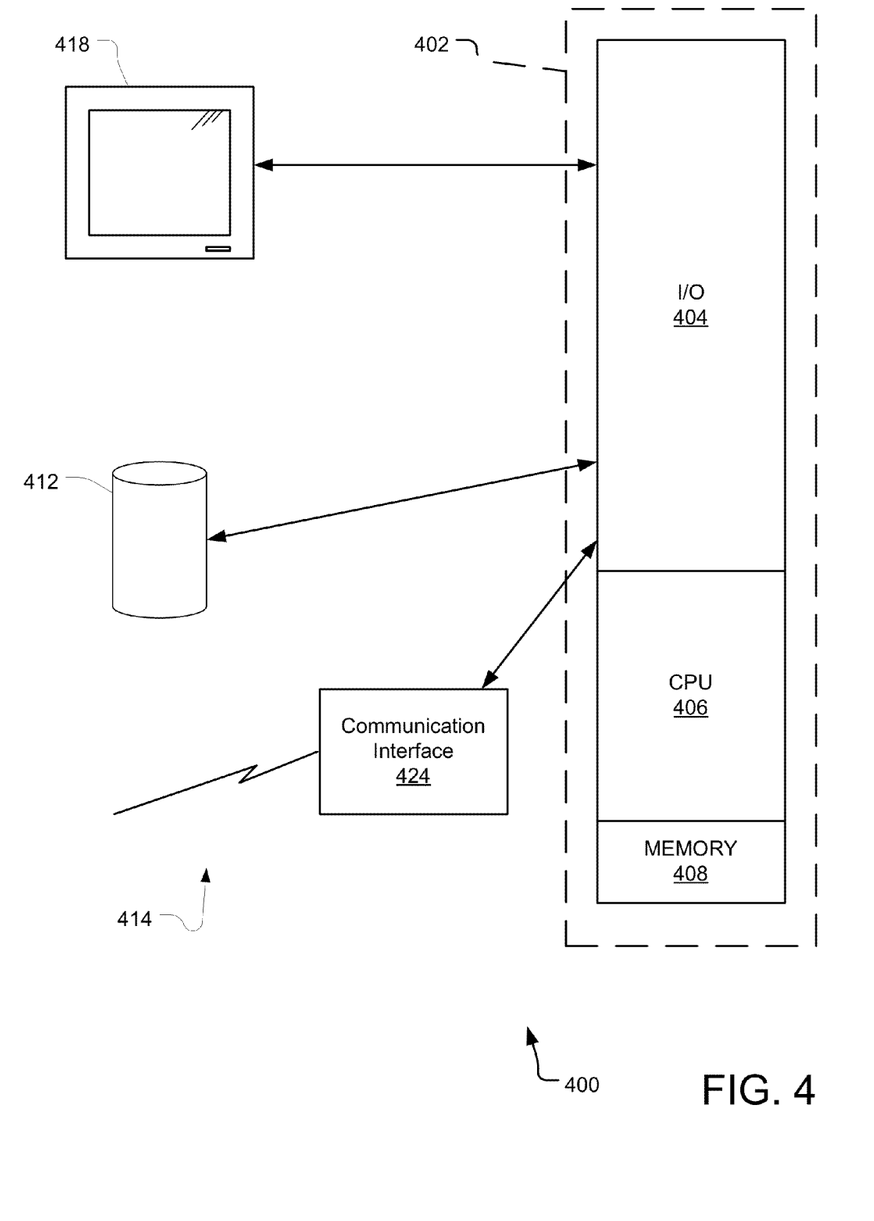
FIG. 4 discloses a block diagram of a computer system suitable for implementing aspects of at least one implementation of a peer-to-peer vibration mitigation system.

FIG. 4 discloses a block diagram of a computer system 400 suitable for implementing one or more aspects of a peer-to-peer vibration mitigation system. The computer system 400 is capable of executing a computer program product embodied in a tangible computer-readable storage medium to execute a computer process. Data and program files may be input to the computer system 400, which reads the files and executes the programs therein using one or more processors. Some of the elements of a computer system 400 are shown in FIG. 4 wherein a processor 402 is shown having an input/output (I/O) section 404, a Central Processing Unit (CPU) 406, and a memory section 408. There may be one or more processors 402, such that the processor 402 of the computing system 400 comprises a single central-processing unit 406, or a plurality of processing units. The processors may be single core or multi-core processors. The computing system 400 may be a conventional computer, a distributed computer, or any other type of computer. The described technology is optionally implemented in software loaded in memory 408, a disc storage unit 412, and/or communicated via a wired or wireless network link 414 on a carrier signal (e.g., Ethernet, 3G wireless, 4G wireless, LTE (Long Term Evolution)) thereby transforming the computing system 400 in FIG. 4 to a special purpose machine for implementing the described operations.

The I/O section 404 may be connected to one or more user-interface devices (e.g., a keyboard, a touch-screen display unit 418, etc.) or a disc storage unit 412. Computer program products containing mechanisms to effectuate the systems and methods in accordance with the described technology may reside in the memory section 404 or on the storage unit 412 of such a system 400.

A communication interface 424 is capable of connecting the computer system 400 to a network via the network link 414, through which the computer system can receive instructions and data embodied in a carrier wave. When used in a local area networking (LAN) environment, the computing system 400 is connected (by wired connection or wirelessly) to a local network through the communication interface 424, which is one type of communications device. When used in a wide-area-networking (WAN) environment, the computing system 400 typically includes a modem, a network adapter, or any other type of communications device for establishing communications over the wide area network. In a networked environment, program modules depicted relative to the computing system 400 or portions thereof, may be stored in a remote memory storage device. It is appreciated that the network connections shown are examples of communications devices for and other means of establishing a communications link between the computers may be used.

In one implementation, the computer system 400 is used to implement a host server having a processor 402 communicatively coupled to a plurality of storage nodes (not shown) and/or one or more chassis-level controllers (not shown). In another implementation, the computer system 400 is used to implement a storage node having a processor 402 that is communicatively coupled to processors of other storage nodes, one or more chassis-level controllers, or the host server. In yet another example implementation, the computer system 400 is configured to communicate with system storage nodes, a host computer, or a drive-level chassis by way of the communication interface 424, which may be an Ethernet port, USB connection, or other physical connection such as an I2C, SAS, SATA, or PLe connection.

Peer to peer vibration mitigation operations and techniques may be embodied by instructions stored in memory 408 and/or the storage unit 412 and executed by the processor 402. Further, local computing systems, remote data sources and/or services, and other associated logic represent firmware, hardware, and/or software that may also be configured to perform such operations. Further, any one of the host computer, a chassis-level controller, or a distributed computing storage node may be implemented using a general purpose computer and specialized software (such as a server executing service software), a special purpose computing system and specialized software (such as a mobile device or network appliance executing service software), or other computing configurations. In addition, program data, such as task distribution information, storage node degradation information, and other data may be stored in the memory 408 and/or the storage unit 412 and executed by the processor 402.

It is not necessary for all of the devices shown in FIG. 4 to be present to practice an implementation. Furthermore, the devices and subsystems may be interconnected in different ways from that shown in FIG. 4. The implementations described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the implementations of the invention described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

The above specification, examples, and data provide a complete description of the structure and use of exemplary implementations of the invention. Since many implementations of the invention can be made without departing from the spirit and scope of the invention, the invention resides in the claims hereinafter appended.

What is claimed is:

1. A method comprising:
   detecting vibration-related performance degradation;
   initiating, in a first storage node, a communication over a drive operation interface to a second storage node in a distributed computing system, the communication requesting an action for decreasing vibration-related performance degradation in the first storage node.

2. The method of claim 1, wherein the drive operation interface is a physical interface that is separate from a primary data interface.

3. The method of claim 1, wherein the communication indicates a degree of vibration affecting the storage node.

4. The method of claim 1, wherein the communication includes a request that the second storage node modify its behavior to reduce the vibration-related performance degradation in the storage node.

5. The method of claim 1, wherein the action requested is performed by a processor in the second storage node without receiving an instruction from a host server.

6. The method of claim 1, wherein the communication includes directional aspects of the vibration-related performance degradation.

7. One or more non-transitory computer-readable storage media encoding computer-executable instructions for executing on a computer system a computer process, the computer process comprising:
   detecting vibration-related performance degradation;
   initiating, in a storage node, a communication over a drive operation interface to a chassis-level controller in a chassis of a distributed computing system, the communication requesting an action for decreasing vibration-related performance degradation in the storage node.

8. The one or more computer-readable storage media of claim 7, wherein the drive operation interface is a physical interface that is separate from a primary data interface.

9. The one or more computer-readable storage media of claim 7, wherein the communication indicates a degree of vibration affecting the storage node.

10. The one or more computer-readable storage media of claim 7, wherein the chassis-level controller transmits a request for a location-based corrective action for decreasing the vibration-related performance degradation in the storage node.

11. The one or more computer-readable storage media of claim 7, wherein the chassis-level controller alters the speed of a fan to decrease the vibration-related performance degradation in the storage node.

12. The one or more computer-readable storage media of claim 7, wherein the action requested is performed by the chassis level controller without receiving an instruction from a host server.

13. The one or more computer-readable storage media of claim 7, wherein the communication includes directional aspects of the vibration-related performance degradation.

14. A system comprising:
a drive operation interface for initiating a communication in a storage node of a plurality of storage nodes to an external component, wherein the drive operation interface is a physical interface that is separate from a primary data interface between the storage node and the external component, wherein the communication requests an action for decreasing vibration-related performance degradation in the storage node.

15. The system of claim 14, wherein the communication initiated in the storage node is communicated to at least one of another one of the plurality of storage nodes or a chassis-level controller.

16. The system of claim 14, wherein the communication indicates a degree of vibration affecting the storage node.

17. The system of claim 14, wherein the communication includes a request that another storage node modify its behavior to reduce the vibration-related performance degradation in the storage node.

18. The system of claim 14, wherein the communication is received by a chassis-level controller, and the chassis-level controller transmits a request for a location-based corrective action for decreasing the vibration-related performance degradation in the storage node.

19. The system of claim 14, wherein the communication includes directional aspects of the vibration-related performance degradation.

* * * * *